(12) United States Patent
Kinast et al.

(10) Patent No.: US 9,469,796 B2
(45) Date of Patent: Oct. 18, 2016

(54) METHOD FOR PRODUCING A BONDED BOW CONTACT FOR CURRENT COLLECTORS

(71) Applicant: PanTrac GmbH, Berlin (DE)

(72) Inventors: Bernd Kinast, Berlin (DE); Andreas Schulz, Berlin (DE)

(73) Assignee: PanTrac GmbH, Berlin (DE)

( * ) Notice: Subject to any disclaimer, the term of this patent is extended or adjusted under 35 U.S.C. 154(b) by 0 days.

(21) Appl. No.: 14/771,538

(22) PCT Filed: Mar. 18, 2013

(86) PCT No.: PCT/EP2013/055526
§ 371 (c)(1),
(2) Date: Aug. 31, 2015

(87) PCT Pub. No.: WO2014/146674
PCT Pub. Date: Sep. 25, 2014

(65) Prior Publication Data
US 2016/0017190 A1    Jan. 21, 2016

(51) Int. Cl.
| | | |
|---|---|---|
| *C09J 161/06* | (2006.01) | |
| *C09J 9/00* | (2006.01) | |
| *C09J 11/04* | (2006.01) | |
| *B60L 5/20* | (2006.01) | |
| *C08K 3/22* | (2006.01) | |
| *C09J 5/06* | (2006.01) | |
| *C09J 9/02* | (2006.01) | |
| *C09J 163/00* | (2006.01) | |
| *C08K 3/08* | (2006.01) | |

(52) U.S. Cl.
CPC .............. *C09J 161/06* (2013.01); *B60L 5/205* (2013.01); *C08K 3/22* (2013.01); *C09J 5/06* (2013.01); *C09J 9/00* (2013.01); *C09J 9/02* (2013.01); *C09J 11/04* (2013.01); *C09J 163/00* (2013.01); *C08K 3/08* (2013.01); *C08K 2003/085* (2013.01); *C08K 2003/2275* (2013.01); *C08K 2201/001* (2013.01); *C09J 2400/163* (2013.01); *C09J 2461/00* (2013.01); *C09J 2463/00* (2013.01)

(58) Field of Classification Search
CPC ........... C09J 161/06; C09J 11/04; C09J 9/00
USPC ...................................................... 156/330
See application file for complete search history.

(56) References Cited

U.S. PATENT DOCUMENTS

| | | | | |
|---|---|---|---|---|
| 2004/0075802 | A1* | 4/2004 | Kitamura ............. | C08G 59/621 349/153 |
| 2006/0060296 | A1 | 3/2006 | Sigler et al. | |
| 2013/0224474 | A1* | 8/2013 | Theunissen ................ | C09J 5/06 428/323 |

FOREIGN PATENT DOCUMENTS

| | | | | |
|---|---|---|---|---|
| DE | EP 0313880 A2 * | 5/1989 | ............. | B60L 5/205 |
| EP | 0313880 | 5/1989 | | |
| EP | 0313880 A2 | 5/1989 | | |

OTHER PUBLICATIONS

International Search Report mailed Nov. 13, 2013 in PCT/EP2013/055526.

* cited by examiner

*Primary Examiner* — Daniel Lee
(74) *Attorney, Agent, or Firm* — Fox Rothschild LLP; Gregory A. Nelson

(57) ABSTRACT

The invention relates to a method for producing a connection between a carbon strip and a metal mounting of a bow contact for current collectors by means of an adhesive containing electrically conductive particles. The method is characterized in that the adhesive contains 40 to 50 parts by weight of a first adhesive component on the basis of a phenolic resin, 5 to 20 parts by weight of a second adhesive component on the basis of an epoxy resin, and 40 to 50 parts by weight of conductive particles.

6 Claims, No Drawings

METHOD FOR PRODUCING A BONDED BOW CONTACT FOR CURRENT COLLECTORS

CROSS-REFERENCE TO RELATED APPLICATIONS

This application is a §371 U.S. national stage entry of International Application No. PCT/EP2013/055526, filed Mar. 18, 2013, which is hereby incorporated herein by reference in its entirety.

The invention relates to a method for producing a connection between a carbon strip and a metal mounting of a bow contact for current collectors by means of an adhesive.

TECHNOLOGICAL BACKGROUND AND PRIOR ART

Bow contacts intended to transfer electrical currents between electrical conductors which move relative to one another generally have a carbon strip and a metal mounting. The purpose of the mounting and support is primarily to reinforce the carbon strips, the strength of which otherwise would not be able to resist the mechanical loads during operation. The carbon strips are often clamped into the mounting or connected to the mounting by rivets or bolts or screws. Since the known mechanical connections affect the fatigue strength of the carbon strips due to their notch effect, soldered and adhesive connections are used as an alternative to fasten the carbon strips on the mounting. For example, the carbon strip is bonded to a mounting in the form of a sheet-metal support using a synthetic-resin layer. The synthetic resin is applied to the lower side of the strip, which is provided in advance with a copper layer to improve current distribution, and to the sheet-metal mounting, the parts are joined and the synthetic-resin layers are cured. The electrical resistance of the connecting adhesive layer can be reduced by metal powders (DE 26 54 264 A1), which are embedded in the adhesive layer. A further improvement of the operating characteristics of bonded bow contacts can be achieved if the carbon strip surface and mounting surface to be bonded are roughened, coated with a diluted adhesive solution, electrically conductive particles are applied to at least one adhesive layer, the surfaces are pressed together and the adhesive layers are cured (EP 0 313 880 B1).

There is, however, still a continuing need to improve the long-term stability of the bow contact and the process reliability of its manufacture.

SUMMARY OF THE INVENTION

Using the inventive method for producing a connection between a carbon strip and a metal mounting of a bow contact for current collectors by means of an adhesive containing electrically conductive particles, one or more limitations of the prior art can be removed or at least reduced. The method is characterised in that the adhesive contains 40 to 50 parts by weight of a first adhesive component on the basis of a phenolic resin, 5 to 20 parts by weight of a second adhesive component on the basis of an epoxy resin, and 40 to 50 parts by weight of conductive particles, preferably of copper.

The invention is based on the finding that the use of an adhesive of a mixture of a phenolic resin and an epoxy resin enables the bow contacts to be produced with a particularly high process reliability and, moreover, improves the mechanical properties of the bow contact, for example its long-term operability. In particular, increased stress peaks at the sides of the bonded carbon strip can be compensated, because the elastic behaviour of the adhesive used according to the invention is considerably improved. Also, the thermal endurance at temperatures of 190° C. and the thermal stability at temperatures above 250° C. is improved (control characteristic shear strength).

The first adhesive component is thus a phenolic resin. Phenolic resins can be synthesised by polycondensation of phenols with aldehydes and usually form thermosetting plastics (phenoplasts). The first adhesive component can contain further additives for stabilisation or adjustment of the adhesive properties.

The second adhesive component is an epoxy resin, i.e. a polyether usually having two terminal epoxide groups. The epoxy resin is converted to the macromolecular plastic using a curing agent. Epoxy resins are obtained, for example, by conversion of epichlorohydrin with polyols or dicarboxylic acids. The epoxy resins used according to the invention can also contain additives.

Finally, the plastic contains the above fractions of conductive particles, mostly in the form of an added metal powder. The particles consist, for example, of copper, iron and aluminium or are present as silver-coated copper particles. The adhesive is usually prepared freshly from the above components, then applied and cured.

According to a preferred realisation of the method the epoxy resin contains a mixture of at least 2 components selected from the group comprising bisphenol A epoxy resin, bisphenol F epoxy resin and novolac epoxy resin. It is particularly preferred for all three of the above components to be part of the epoxy resin. The epoxy resin contains in particular 30 to 60 parts by weight of bisphenol A epoxy resin, 10 to 40 parts by weight of bisphenol F epoxy resin and 5 to 30 parts by weight of novolac epoxy resin. It is particularly preferred for the epoxy resin to contain 40 to 50 parts by weight of bisphenol A epoxy resin, 15 to 30 parts by weight of bisphenol F epoxy resin and 10 to 20 parts by weight of novolac epoxy resin. The use of a mixture of the above epoxy resins gives bonded bow contacts which are particularly durable as regards temperature exposure and which resist the high mechanical loads.

Furthermore, the adhesive can contain 3 to 10 parts by weight of additives. In particular, $Fe_3O_4$ can be added to improve the storage stability of the adhesive, particularly so if the adhesive already contains as a further additive an accelerator for curing at room temperature. Further known additives are, for example, $SiO_2$. If required, the adhesive can be adjusted to a viscosity allowing easy processing prior to its intended use by adding a solvent or also a reactive diluent.

The adhesive is preferably cured at a pressure of 30 to 40 $N/cm^2$ and/or at a temperature within the range from 80 to 200° C., in particular 100 to 130° C. The above conditions allow for the manufacture of bonded bow contacts of a particularly high quality.

DETAILED DESCRIPTION OF THE INVENTION

The preparation of the adhesive will now be explained in greater detail with reference to an exemplary embodiment.

First of all, a first adhesive component is processed in a mixing container. For this purpose, 47 parts by weight of a phenolic resin, 1 part by weight of graphite powder, 2 parts by weight of $SiO_2$ particles and 50 parts by weight of copper powder are blended.

15 parts by weight of a second mixture of a bisphenol A epoxy resin (low-molecular, 45 parts by weight of the second mixture), bisphenol F epoxy resin (low-molecular, 22 parts by weight of the second mixture) and novolac-modified epoxy resin (19 parts by weight of the second mixture) are then added to 85 parts by weight of said first mixture.

The adhesive is applied to the adherend of the aluminium mounting by means of a spatula. The application width of the adhesive is usually just below the strip width, and the adhesive is applied in amounts within the range from 0.1 to 0.2 g/cm². The carbon strip and the aluminium mounting are joined and cured in a splicer at a pressure of 30 to 40 N/cm² for approximately eleven hours between 100 to 130° C.

The invention claimed is:

1. A method for producing a connection between a carbon strip and a metal mounting of a bow contact for current collectors by means of an adhesive containing electrically conductive particles, comprising the steps of:
   applying the adhesive to at least one of the carbon strip and the metal mounting, wherein the adhesive contains a blended mixture of
   40 to 50 parts by weight of a phenolic resin,
   5 to 20 parts by weight of an epoxy resin, and
   40 to 50 parts by weight of conductive copper particles;
   wherein the epoxy resin contains
   40 to 50 parts by weight of bisphenol A epoxy resin,
   15 to 30 parts by weight of bisphenol F epoxy resin, and
   10 to 20 parts by weight of novolac epoxy resin;
   joining the carbon strip to the metal mounting with the adhesive mixture there between; and
   curing the adhesive mixture.

2. The method according to claim 1, wherein $Fe_3O_4$ is added as an additive.

3. The method according to claim 1, wherein the adhesive contains 3 to 10 parts by weight of additives.

4. The method according to claim 1, wherein the adhesive is cured at a pressure of 30 to 40 N/cm².

5. The method according to claim 1, wherein the adhesive is cured at a temperature within a range from 80 to 200° C.

6. The method according to claim 5, wherein the adhesive is cured at a temperature within a range from 100° C. to 130° C.

* * * * *